United States Patent [19]
Eckart

[11] 3,840,783
[45] Oct. 8, 1974

[54] SYSTEM AND APPARATUS FOR DETECTING GROUND FAULTS ON UNGROUNDED, POLYPHASE POWER DISTRIBUTION SYSTEMS

[75] Inventor: Gregory Craig Eckart, Plainville, Conn.

[73] Assignee: General Electric Company, New York, N.Y.

[22] Filed: July 26, 1973

[21] Appl. No.: 382,730

[52] U.S. Cl. ............... 317/18 D, 317/26, 317/27 R
[51] Int. Cl. ........................................... H02h 7/26
[58] Field of Search ........ 317/18 R, 18 D, 27 R, 26

[56] References Cited
UNITED STATES PATENTS

| | | | |
|---|---|---|---|
| 1,721,409 | 7/1929 | Pohl | 317/18 R |
| 2,383,329 | 8/1945 | McConnell | 317/18 R |
| 3,585,452 | 6/1971 | Goodwin | 317/18 D |

Primary Examiner—James D. Trammell
Attorney, Agent, or Firm—Robert A. Cahill; P. L. Schlamp; F. L. Neuhauser

[57] ABSTRACT

The disclosure is directed to apparatus for sensing a ground fault in a normally ungrounded, polyphase power distribution system. One of the phase lines is coupled to ground through a first inductor which is transformer coupled with a second inductor connected across two other phase lines. A current sensor responses to current flow in the ground circuit including the first inductor resulting from a ground fault on any of the phase lines by signaling a ground fault relay to either provide a fault indication, interrupt the ground circuit or interrupt the phase lines. A system of ground fault sensors and signal interlocked ground fault relays operating in a multi-zone power distribution system is also disclosed.

16 Claims, 1 Drawing Figure

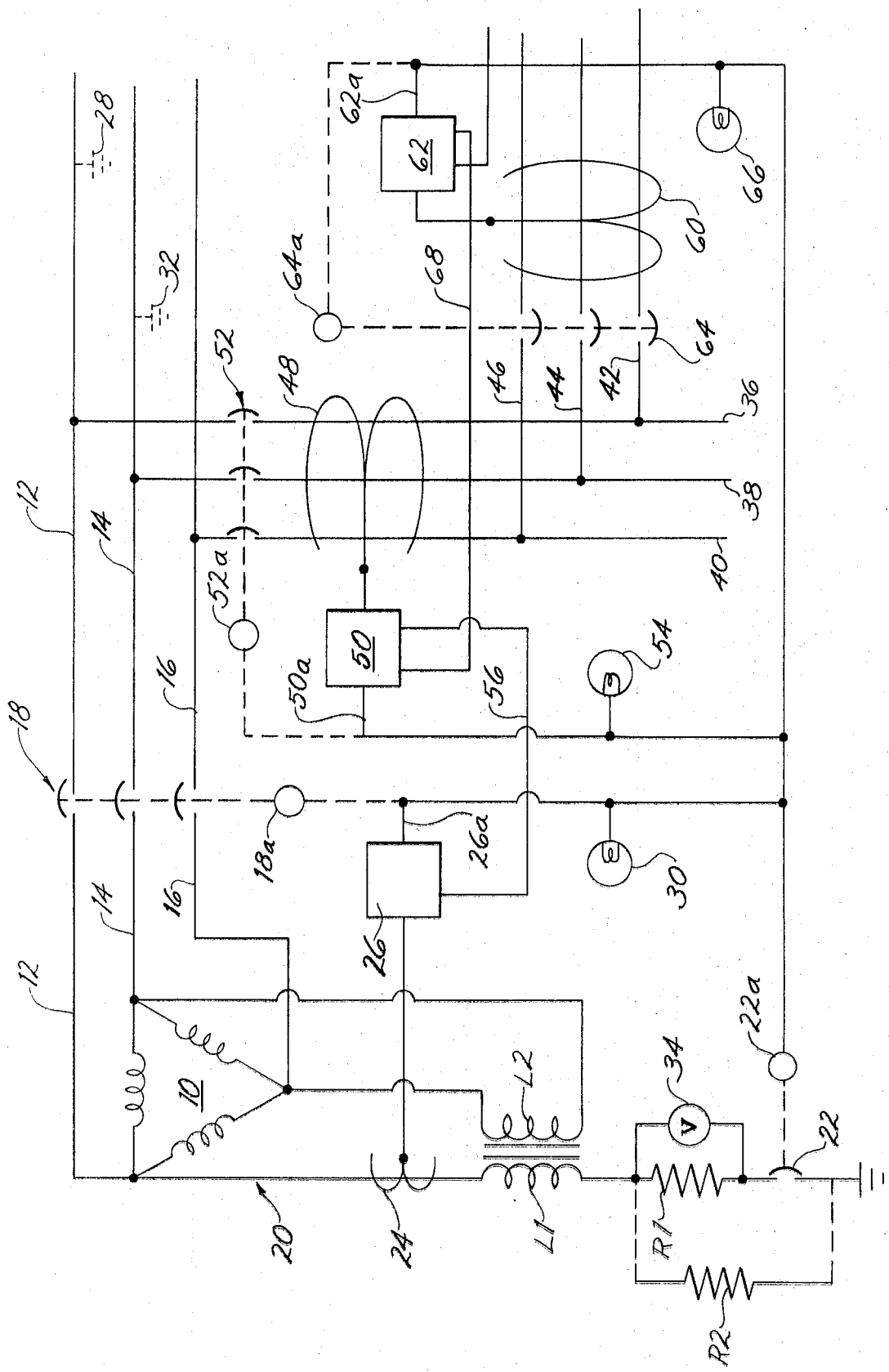

SYSTEM AND APPARATUS FOR DETECTING GROUND FAULTS ON UNGROUNDED, POLYPHASE POWER DISTRIBUTION SYSTEMS

BACKGROUND OF THE INVENTION

Ground fault detection and/or protection for ungrounded polyphase power distribution systems has been attempted in the past. One such approach is to connect a so-called "zig-zag" transformer with grounded neutral to the ungrounded power lines as disclosed in U.S. Pat. Nos. 3,585,452 and 3,678,338. While viable, this approach is relatively expensive due in large measure to the complexity and high cost of the zig-zag transformers. An alternative approach, as disclosed in U.S. Pat. Nos. 2,721,307 and 3,341,741, is to sense the voltage unbalance relative to ground resulting from a ground fault on one of the phase lines. This approach has the drawback of not being very sensitive, particularly while the ground fault remains a reasonably large impedance to ground. U.S. Pat. No. 3,356,939 discloses still another approach using a wye-connected grounding impedance network and a zero sequence transformer to sense the current unbalance in the phase lines resulting from ground leakage current. This approach gives up some of the advantages of an ungrounded power distribution system.

An object of the present invention is to provide an improved system and apparatus for detecting ground faults in an ungrounded polyphase power distribution system.

An additional object of the invention is to provide a system and apparatus of the above character operating in response to ground leakage current to optionally interrupt power or interrupt the ground circuit path and/or activate a signal signifying the presence of a ground fault.

Still another object is to provide a system of the above character which is readily adaptable to zone interlocking in order that only the apparatus associated with the portion of the power distribution system nearest the fault can at least initially execute the options available.

A further object is to provide a system and apparatus of the above character which is both inexpensive and reliable.

Other objects will in part be obvious and in part appear hereinafter.

SUMMARY OF THE INVENTION

In accordance with the present invention, there is provided a system and apparatus therefor to detect ground faults on ungrounded polyphase power distribution systems. The invention provides unique universality in that it can be readily adapted either to effect power interruption or to interrupt the flow of ground leakage current and/or signal the presence of a ground fault on one of the phase conductors. With all of these options available, the system also has utility in a multi-zone distribution system having, for example, main, feeder and branch phase conductors for detecting and locating a ground fault anywhere in the distribution system. The system is preferably suitably zone interlocked in order that apparatus nearest the ground fault performs or initiates the desired measure or measures to be taken in such event.

Generally the apparatus of the invention includes a circuit path connecting the one of the main phase conductors or buses of a normally grounded polyphase power distribution system to ground through a first inductor and normally closed interrupter contacts. A second inductor, transformer coupled with the first, is connected across the other two phases. A current sensor coupled in this circuit path senses current flow therein resulting from a downstream ground fault existing on any one of the phase conductors. The response of this current sensor is fed to a ground relay which, in turn, issues a control signal signifying the existence of a ground fault. This control signal, in accordance with the present invention, may be utilized in a plurality of optional manners. According to one option, the control signal may be utilized to energize a trip coil associated with a main circuit breaker to automatically effect power interruption while the ground fault is located and cleared. Alternatively, the ground fault relay control signal may be used to energize a trip coil associated with the interrupter contacts in the circuit path including the current sensor. The resulting opening of these interrupter contacts is effective to break the loop path for ground current and thus inhibit the continued flow of potentially hazardous and damaging ground leakage current. As a third alternative for use alone or in conjunction with the second option of interrupting the ground circuit path, the control signal issuing from the ground fault relay may be utilized to activate a signal indicating to maintenance personnel the existence of a ground fault on one of the phase conductors.

The above generally described apparatus of the invention is also utilizable in a system format for providing comprehensive detection, location and/or protection in regard to ground faults existing anywhere in a multi-zone, ungrounded, polyphase power distribution system. Assuming the above generally described apparatus to be associated with the main conductors or buses of the system, each of the feeder buses connected off of the main buses is equipped with a zero sequence current transformer and a ground fault relay. If a ground fault occurs on one of the feeder buses downstream from the current transformer, the current imbalance resulting from ground leakage current is sensed by the current transformer, and the ground fault relay is activated to issue its control signal. This feeder relay control signal may be used to trip a feeder circuit breaker or to energize the trip coil associated with the ground circuit path interrupter contacts and/or to activate a signal. In addition, the feeder ground fault relay issues an interlock signal which is transmitted back to the main ground fault relay, imposing either a temporary or a permanent restraint on the issuance of its control signal. This restraint affords the feeder fault relay sufficient time to effect the desired response in the event of a ground fault in its zone.

Lower ordered branch zones are also equipped with a zero sequence current transformer and a fault relay to detect ground faults in branch buses connected off of the feeder buses. Control signals issued by the branch ground fault relays are used either to effect branch circuit interruption or interruption of the ground circuit path and/or to activate a signal in response to a ground fault existing in its zone. Additionally, the branch ground fault relays are interlocked with the feeder and main relays to impose restraints thereon that allow the affected branch relay sufficient opportunity to produce the desired response to a ground fault in its zone.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawing, in which the sole FIGURE is a circuit schematic diagram, partially in block form, illustrating the various optional embodiments of the invention.

DETAILED DESCRIPTION

Referring to the drawing, an ungrounded, delta-connected alternating current source, generally indicated at 10, is connected to supply power on main buses 12, 14 and 16 of a polyphase power distribution system; the main buses being interruptible by the contacts of a main switch or circuit breaker, generally indicated at 18. Bus 12 is coupled to ground by a circuit path, indicated generally at 20, and shown as including an inductor L1, a resistor R1, and normally closed circuit interrupter contacts 22. Resistor R1 is a current limiting resistor of approximately 25 to 50 ohms included for the purpose of limiting the magnitude of current flow in circuit path 20. Optionally, resistor R1 and interrupter contacts 22 may be shunted by a resistor R2 of approximately 300 ohms or more to limit wild voltage fluctuations on the main buses. A second inductor L2, transformer coupled with inductor L1 in circuit path 20, is connected across main buses 14 and 16. A current sensor, indicated at 24, is responsive to current flow in circuit path 20 to develop a signal for application to a ground fault relay 26. An appropriate current sensor may take the form of a window or ring type current transformer surrounding current path 20 with a wound secondary winding for developing a signal induced by current flow in circuit path 20 for application to ground fault relay 26. Various types of suitable current sensors for use in the illustrated invention are currently available from the Circuit Protective Devices Product Department of the General Electric Company, Plainville, Connecticut under the catalog number prefix TGS. Suitable ground fault relays for use in the present invention are available from the same source under the catalog number prefix TGSR.

Considering the operation of the apparatus thus far described, it is seen that when a ground fault, such as indicated at 28, occurs on main bus 12 a closed loop secondary circuit including the portion of main bus 12 between the ground fault and the source 10 and the circuit path 20 is completed. As a consequence, the current flowing in inductor L2 connected between main buses 14 and 16 induces a current in this closed loop secondary circuit via inductor L1 which is sensible by current sensor 24. The output of this current sensor activates the ground fault relay 26 to issue a control signal on its output 26a. This ground fault relay control signal may be used in one or more of the following ways. First, it may be used to activate trip coil 18a associated with main circuit breaker 18 to open the main buses 12, 14 and 16 and interrupt power. Alternatively, the ground fault relay control signal may be supplied to activate a trip coil 22a, causing interrupter contacts 22 to open and thereby interrupt the flow of current in circuit path 20. As a third alternative, for use alone or in conjunction with the tripping of interrupter contacts 22, the control signal issuing from ground fault relay 26 may be used to activate an alarm or signal 30 indicating to personnel that a ground fault exists on one of the main buses.

On the other hand, if a fault occurs on buses 14 or 16, the operation is as follows. Assuming a fault at 32 on bus 14 downstream from source 10, it is seen that ground leakage current will flow from bus 14 through the ground fault at 32 and return through circuit path 20 to the delta source 10. A ground fault on main bus 16 would also produce leakage current flow through circuit path 20. This leakage current is sensed by current sensor 24 to activate the ground fault relay 26, and the resulting relay output on line 26a is used in either one or more of the options previously described.

According to a feature of the invention, a voltmeter 34 may be connected across resistor R1 in circuit path 20 to indicate which of the main buses is faulted. As will be apparent to those skilled in the art, meter 34 will, prior to the opening of contacts 22, read the approximate line to ground voltage of the faulted phase bar which is different for each phase. For example, in a 480 volt delta system connected as shown, the meter will, depending on the character of the fault, read up to a maximum of 240 volts if bus 12 is ground faulted, a maximum of 535 volts if bus 14 is ground faulted and a maximum of 415 volts if bus 16 is ground faulted. According to an additional feature of the invention, the transformer ratio between inductors L2 and L1 may be other than one to one, such as, for example, two to one, so as to limit the magnitude of current induced in circuit path 20 as the result of a ground fault on main bus 12. This also serves to decrease the potential level of the delta system with respect to ground, this relieving insulation stress, etc.

Returning to the description of the drawing, a typical multi-zone power distribution system will include at least one and typically a plurality of branch buses, such as indicated at 36, 38 and 40, connected to main buses 12, 14 and 16, respectively. In the same fashion, at least one and typically a plurality of branch buses, such as indicated at 42, 44 and 46 are connected off of feeder buses 36, 38 and 40, respectively. A three-tiered or zoned power distribution system as illustrated in the drawing is typical of the system found in practice.

Referring to the feeder buses, a zero sequence current transformer 48 encompassing the feeder buses, which serve as primary windings therefor, develops a signal for application to a feeder ground fault relay 50 in the event of any imbalance in the currents flowing in the feeder buses. Such a current imbalance, resulting from ground leakage current, produces a net flux in transformer 48 acting to induce a signal in the secondary winding thereof capable of triggering ground fault relay 50. The control signal output on line 50a may be used to activate a trip coil 52a of feeder circuit breaker 52 causing the interruption of power in feeder buses 36, 38 and 40. Alternatively, the feeder relay control signal output may be used to activate trip coil 22a to open interrupter contacts 22 and thereby open the ground circuit path for the faulted feeder bus. Additionally, the feeder relay output may be utilized to activate an alarm 54.

Since a faulted feeder bus will result in current flow in the circuit path 20, main ground fault relay 26 will also be activated by current sensor 24. To prevent this main ground fault relay from issuing its control signal, feeder ground fault relay 50 issues an interlocking or restraining signal on line 56 which is fed upstream to the main ground fault relay 26. This restraint may be temporary or permanent as desired. This restraint will afford feeder ground fault relay 50 sufficient time to act either to trip feeder breaker 52, trip the interrupter contacts 22 or activate alarm 54. By inhibiting the control signal output from main ground fault relay 26, interruption of the main circuit breaker 18 is avoided while feeder breaker 52 is tripped to clear the fault, if this is the option utilized. Similarly, inhibiting the control signal output from the main relay 26 will prevent the alarm 30 from being activated while the feeder-associated alarm 54 is activated to more precisely indicate the location of the ground fault.

Branch buses 42, 44 and 46 are handled in the same manner as feeder buses 36, 38 and 40. Specifically, a zero sequence current transformer 60 signals a branch fault relay 62 when a current imbalance is sensed in the branch buses resulting from a downstream ground fault thereon. The resulting relay control signal issuing on line 62a may be used to activate a trip coil 64a and open the contacts of a branch relay 64. Alternatively, the branch ground fault relay control signal output may be used to activate trip coil 22a, opening the interrrupter contacts 22 in circuit path 20, and thereby interrupt the current flow therein resulting from a fault on any one of the branch buses. Either as a separate function or in conjunction with either tripping the branch circuit breaker 64 or the interrupter contacts 22, the branch ground fault relay control signal output may be used to activate a signal or alarm 66.

Since a ground fault on one of the branch buses downstream from transformer 60 will also be sensed by the feeder transformer 48 as well as the main current sensor 24, it is desirable for the branch ground fault relay to send an interlocking or restraining signal upstream to the feeder ground fault relay 50 over line 68. This restraining signal inhibits the issuance of the feeder ground fault relay control signal on output line 50a. Since feeder ground fault relay 50 is signaled by its associated current transformer 48 due to the sensed current imbalance in the feeder buses, a restraining signal on line 56 is sent upstream to the main ground fault relay 26 to inhibit the issuance of its control signal on output line 26a. It is thus seen that, by virtue of this interlocking arrangement, the main ground fault relay 26 and the feeder ground fault relay 50 are either temporarily or permanently restrained from acting in response to a ground fault existing on a branch bus, thus affording the branch ground fault relay 62 sufficient time to take the desired action with regard to a ground fault located in its zone of responsibility.

It will be appreciated that the apparatus of the invention shown associated with the main buses, namely circuit path 20 including inductors L1 and L2, resistor R1, interrupter contacts 22 with trip coil 22a, and optionally voltmeter 34, together with current sensor 24, ground fault relay 26, and, optionally, indicator 30 may be embodied in a portable unit adapted for connection into an ungrounded power distribution system at any point to detect ground faults downstream therefrom. Thus embodied, the apparatus of the invention becomes a useful tool in detecting and locating ground faults anywhere in an ungrounded power distribution system.

It will thus be seen that the objects set forth above, among those made apparent from the foregoing description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. Apparatus for detecting ground faults in a normally ungrounded polyphase electrical power distribution system fed by a delta-connected source, said apparatus comprising, in combination:
    A. a circuit path for electrically coupling one of the phase conductors of the delta-connected source to ground;
    B. a first inductor serially included in said circuit path;
    C. a second inductor transformer coupled with said first inductor, said second inductor adapted for electrical connection between two other phase conductors of the delta-connected source; and
    D. means including a sensor coupled with said circuit path for detecting current flow therethrough resulting from a ground fault on any one of the phase conductors.

2. The apparatus defined in claim 1, which further includes a current limiter serially included in said circuit path.

3. The apparatus defined in claim 2, which further includes a voltmeter connected across said current limiter to provide a reading indicative of which one of the phase conductors is experiencing a ground fault.

4. The apparatus defined in claim 1 wherein the transformer coupling between said second inductor and said first inductor is on the order of two to one.

5. The apparatus defined in claim 1, which further includes ground fault relay connected to respond to said sensor.

6. The apparatus defined in claim 5, which further includes a circuit breaker controlled by said ground fault relay to open the phase conductors upon the existence of a ground fault thereon.

7. The apparatus defined in claim 5, which further includes normally closed circuit interrupter contacts serially connected in said circuit path, said interrupter contacts being operated by said fault relay to open said circuit path upon the existence of a ground fault on one of the phase conductors.

8. The apparatus defined in claim 5, which further includes signaling means connected to be activated by said ground fault relay upon the existence of a ground fault on one of the phase conductors.

9. A system for detecting ground faults on an ungrounded, multizone, three-phase power distribution system including main and feeder buses, said ground fault detecting system comprising:
    A. a circuit path electrically coupling one of the main buses to ground;
    B. a first inductor serially included in said circuit path;
    C. a second inductor transformer coupled with said first inductor, said second inductor electrically connected between the other two of the main buses;

D. a current sensor coupled with said circuit path for detecting current flow therethrough resulting from a downstream ground fault on the distribution system;

E. a main ground fault relay activated by said current sensor to issue a first control signal in the event of a downstream ground fault;

F. first means responsive to said first control signal;

G. a zero sequence current transformer coupled with the feeder buses connected from the main buses to sense a downstream ground fault;

H. a feeder ground fault relay activated by said current transformer to issue a second control signal in the event of a downstream ground fault;

I. second means responsive to said second control signal; and

J. signaling means interconnecting said feeder ground fault relay and said main ground fault relay for imposing a restraint on the issuance of said first control signal in the event of a ground fault sensed on one of the feeder buses.

10. The ground fault detecting system defined in claim 9, wherein said first responsive means is a main circuit breaker for interrupting power in said main buses and said main buses and said second responsive means is a feeder circuit breaker for interrupting power in said feeder buses.

11. The ground fault detecting system defined in claim 9, wherein said first and second responsive means comprise a common trip coil operating to open interrupter contacts in said circuit path in response to either of said first and second control signals.

12. The ground fault detecting system defined in claim 9, wherein said first and second responsive means comprise separate signal indicators.

13. The ground fault detection system defined in claim 9, wherein the distribution system includes branch buses connected from the feeder buses, said ground fault detecting system further including:

A. branch zero sequence current transformer coupled with the branch buses to sense a downstream ground fault;

B. a branch ground fault relay activated by said branch current transformer to issue a third control signal in the event of a downstream ground fault;

C. third means responsive to said third control signal; and

D. second signaling means interconnecting said branch ground fault relay and said feeder ground fault relay to impose a restraint on the issuance of said second control signal in the event of a ground fault sensed on one of the branch buses.

14. The ground fault detection system defined in claim 13, wherein said first responsive means is a main circuit breaker for interrupting power on the main buses, said second responsive means is a feeder circuit breaker for interrupting power on the feeder buses, and said third responsive means is a branch circuit breaker for interrupting power on the branch buses.

15. The ground fault detection system defined in claim 13, wherein said first, second and third responsive means comprise a common trip coil operating to open interrupter contacts in said circuit path in response to either of said first, second and third control signals.

16. The ground fault detection system defined in claim 13, wherein said first, second and third responsive means comprise separate signal indicators.

* * * * *